Jan. 17, 1961 B. C. DE LOACH, JR 2,968,771
STEP-TWIST JUNCTION WAVEGUIDE FILTER
Filed Dec. 31, 1957 2 Sheets-Sheet 1

FIG. I

INVENTOR
B.C. DELOACH, JR.
BY
ATTORNEY

Jan. 17, 1961     B. C. DE LOACH, JR     2,968,771
STEP-TWIST JUNCTION WAVEGUIDE FILTER
Filed Dec. 31, 1957     2 Sheets-Sheet 2

INVENTOR
B.C. DeLOACH, JR.
BY
ATTORNEY

United States Patent Office 2,968,771
Patented Jan. 17, 1961

2,968,771

STEP-TWIST JUNCTION WAVEGUIDE FILTER

Bernard C. De Loach, Jr., Little Silver, N.J., assignor to Bell Telephone Laboratories, Incorporated, New York, N.Y., a corporation of New York Filed Dec. 31, 1957, Ser. No. 706,331

9 Claims. (Cl. 333—73)

This invention relates to electromagnetic wave filters and more particularly to resonant cavity filters using step-twist junctions.

The conventional resonant cavity filter comprises a section of uniform guide, bounded by two discontinuities, as for example, two inductive irises. An analysis of the operation of a filter so constructed involves a consideration of the phase and amplitude of the energy reflected by the individual discontinuities. With a pure inductive or pure capacitive iris, reflections at the discontinuity appear to come from a pure susceptance, and both the phase and amplitude of the reflected energy vary in a prescribed and unalterable manner as the physical dimensions of the iris are varied. One, therefore, designs the size of the opening at the discontinuity for a particular bandwidth, and tunes the cavity to the desired resonant frequency by selecting a particular length of separation between discontinuities. At the particular frequency for which the component reflections from the two irises cancel, power is freely transmitted. While a very substantial standing wave is found inside the chamber, the waveguide approaches on either side thereof, appear electrically smooth.

Thus, once the distance between discontinuities is fixed, any variation in the size of the irises has the undesirable effect of varying, in an unalterable manner, both the bandwidth and resonant frequency of the filter. Because of this immutable interdependence of frequency and bandwidth, the usefulness of this class of filter is severely limited.

If, on the other hand, a section of waveguide is bounded by two discontinuities having complex impedances, the reflections from each discontinuity will appear to come not from a pure susceptance, but rather from a pure susceptance in parallel with a conductance. As a result of this difference, an additional degree of freedom is available to the filter designer. For in this latter class of device, while the magnitude of both the conductance and susceptance determines the amplitude of the reflected energy, it is their ratio that determines its phase. Thus, for a particular amount of reflected energy, i.e., a particular bandwidth, there is available in the design of the iris means for separately controlling the phase of the reflected energy. This extra variable thus makes it possible to choose the manner in which the resonant frequency of the filter will vary as the iris dimensions are changed independently from the manner is which its bandwidth will vary, while the physical separation of the irises remains constant.

It is, therefore, an object of this invention to independently vary the amplitude and phase of reflected wave energy in a predetermined manner.

It is another object of this invention to control the electrical distance between reflective irises in a prescribed manner as the impedance of the irises is varied.

It is a further object of this invention to provide electromagnetic wave filtering having variable bandwidth-frequency characteristics.

A convenient means for obtaining a discontinuity having a variable complex impedance is to introduce a step-twist junction in the waveguiding path, where a step-twist junction is defined as a junction formed by two adjoining sections of rectangular waveguide that are twisted relative to each other about a common longitudinal axis. Junctions of this type have been used to rotate the plane of polarization of propagating wave energy, and, as shown in United States Patent 2,736,867, issued to D. D. Montgomery, February 28, 1956, may be used to introduce a variable impedance in a waveguide.

In a particular embodiment of the present invention, a pair of step-twist junctions are formed by placing a rotatable section of hollow rectangular waveguide between two fixed sections of hollow rectangular waveguide. The three sections are aligned along a common longitudinal axis and the fixed sections are orientated so that their corresponding narrow and wide walls are parallel and, in general, of equal size. The rotatable section is free to rotate about the common axis to form the pair of step-twist junctions where the ends thereof abut upon the fixed guides. A structure similar to this is shown in Fig. 2 of the above cited Montgomery patent. If now, in addition, the length of the rotatable section is designed in conjunction with the coupling apertures at the two junctions, a resonant cavity may be formed which is resonant at the frequency to be transmitted through the filter. However, as the cavity section is rotated relative to the fixed guides, the size and shape of the coupling apertures will vary, thus changing the complex impedance introduced by the two discontinuities defining the resonant cavity. In general, such a change will cause both the bandwidth and the center frequency of the filter to undergo some arbitrary, through related variation. The present invention recognizes that means must be provided for controlling the variations of bandwidth and frequency if a variable filter structure of any practical value is to be realized.

In accordance with the teachings of the present invention, the manner in which the size and shape of the coupling apertures vary, as the cavity is rotated, is controlled by the use of suitable corrective irises formed by inserting conductive septa between the fixed and rotatable sections of the filter. By appropriately shaping the irises, it is possible to design a filter having a particular frequency-bandwidth characteristic as a function of the angular displacement about the common axis. While the irises may be attached to either the fixed or rotatable section of the filter, it has been found that by attaching them to the latter, higher Q cavities may be realized.

In a preferred embodiment of the invention, the conductive septa are connected at each end of the rotatable section to form a pair of square apertures whose sides are equal in length to the narrow dimension of the rotatable waveguide section. The use of this particular iris arrangement produces a substantially constant frequency, variable bandwidth filter.

In an alternate embodiment of the invention, each of the corrective irises is a thin conductive member having an aperture cut out of a portion thereof. The equivalent of the semi-permanent type of irises described above would have a square aperture centrally situated, and whose sides are equal to the narrow dimensions of the rotatable waveguide section. Since the corrective irises so made may be readily replaced, a variety of filter responses are obtainable simply by inserting the appropriate corrective irises between the fixed and rotatable sections of waveguide that form the step-twist junctions.

In still another embodiment of the invention, a plurality of resonant cavities are employed, spaced from each other and ganged as will be explained in greater detail hereinafter.

It is a feature of the present invention that because of the complex admittance of the step-twist junctions, filters made in accordance with the invention are considerably shorter than prior art filters.

These and other objects, the nature of the present invention and its various advantages and features will appear more fully upon consideration of the various specific illustrative embodiments shown in the accompanying drawings and described in the following detailed descriptions of these drawings.

Figure 1:
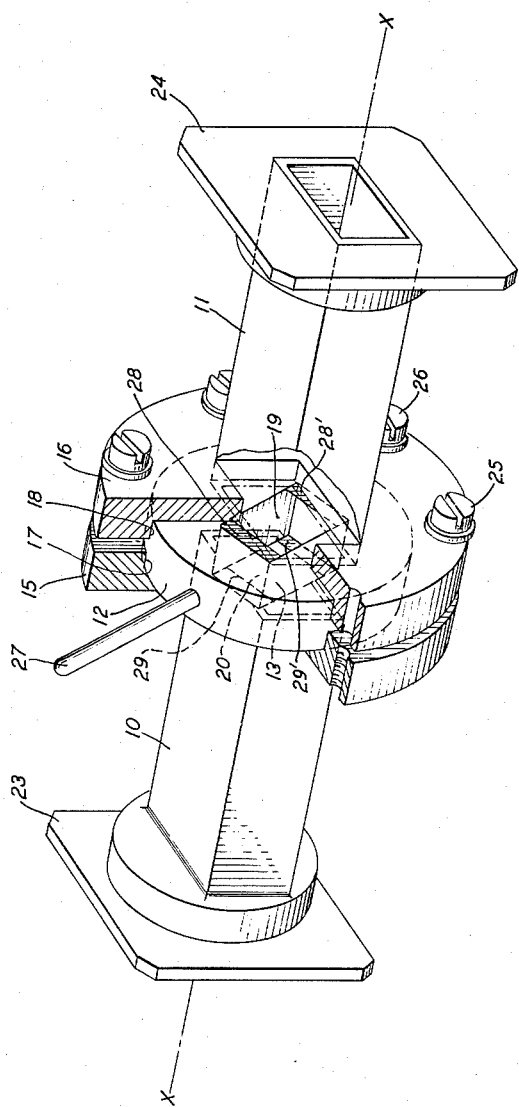
Fig. 1 is a perspective view, partially cut away, of an embodiment of the present invention showing a single cavity step-twist junction filter.

Referring to the drawings, and more particularly to Fig. 1, a filter employing two step-twist junctions is shown as an illustrative embodiment of the present invention.

The filter comprises a pair of sections 10 and 11 of bounded electrical transmission line for guiding electromagnetic wave energy. The sections are coaxially aligned along the common axis $x$—$x$ and may be of the metallic shield type having a rectangular cross-section whose wide dimension is at least one-half wavelength of the wave energy to be conducted thereby, and whose narrow dimension is substantially one-half of the wide dimension. So constituted, these waveguides operate in the dominant mode, known in the art as the $TE_{10}$ mode, in which the electric lines of force extend from the bottom to the top of the waveguides, perpendicular to the wide guide walls.

Interposed between the fixed guides 10 and 11 is the rotatable section 12, made of cylindrical copper stock into which there is machined rectangular waveguide 13, having substantially the same internal dimensions as the fixed guides and whose axis lies along the common axis $x$—$x$. Connected at each end of section 12 are the corrective irises comprising the conductive septa 28, 28', 29 and 29', extending across waveguide 13.

Connected at the ends of the fixed guides are the brass flanges 15 and 16, having outwardly extending annular lips 17 and 18, respectively, dimensioned to receive rotatable section 12. The sliding surfaces of copper and brass are lapped to assure good electrical contact. About the circumference of flanges 15 and 16 and extending therebetween are a number of screws such as 25 and 26 for clamping and holding the several parts of the filter together.

When in place between the fixed guides, the cofacing ends of sections 10, 11 and 12 abut upon each other to form a pair of step-twist junctions having coupling apertures 19 and 20. The apertures thus formed are modified by the conductive septa 28, 28', 29 and 29'. The rotation of guide 13 about the longitudinal axis $x$—$x$ is measured in degrees $\theta_1$ and $\theta_2$, the angles made between corresponding sides of guide 13 and fixed guides 10 and 11, respectively. In the particular illustrative embodiment, guides 10 and 11 are not rotated relative to each other and $\theta_1$ and $\theta_2$. Thus, but one parameter, $\theta$, is needed to specify the junction completely. Since the direction of rotation of guide 12 is irrelevant in this application, $\theta$ will always be regarded as a positive, acute angle between zero and ninety degrees.

As is well known, the impedance offered to electromagnetic wave energy by a conductively bound waveguide is a function of the size and shape of the guide. More particularly, for a rectangular guide the impedance varies as the ratio of the guide height to the guide width. Thus, if the rotatable section of Fig. 1 is adjusted to have zero angular displacement with respect to the fixed guides 10 and 11, and if, for the purposes of the following discussion and development, the conductive septa 28, 28', 29 and 29' are removed all wave energy incident from guide 10 will be transmitted undisturbed through apertures 19 and 20.

When a discontinuity is placed across a waveguide, however, only a portion of the incident wave power is transmitted into the medium beyond the discontinuity, while the remaining portion is reflected backwards. Such discontinuities, depending upon the manner in which they disturb the wave field configuration, produce either capacitive or inductive effects. Referring to Fig. 1, it is evident that by rotating section 12 about axis $x$—$x$, there is a distortion of both the size and shape of the transmission path at the step-twist junctions as end flanges 15 and 16, acting in conjunction with the end surfaces of section 12, partially obstruct the coupling apertures through which the wave energy must pass in going from guide 10 to guide 13 and from guide 13 to guide 11. The effect of this partial obstruction is to introduce at the junctions a combination of shunt inductance and capacitance. The shunt inductance is the predominant component, however, caused by the constriction of the area at the sides of the rectangular cross-section. In this respect, the step-twist junction is comparable to an inductive iris. Since there is also a partial diminution of the narrow dimension of the transmission path, the step-twist junction behaves as a capacitive iris as well.

There is an important difference, however, between the action of the conventional inductive or capacitive iris and the impedance effects produced by the step-twist junction and it is this difference, as will be explained in detail below, which makes possible the filters constructed in accordance with the invention.

Figure 2:
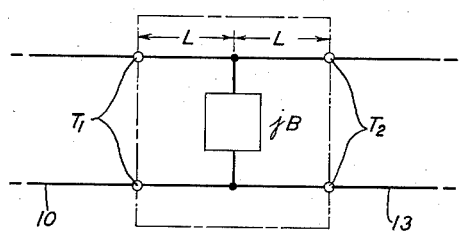
Fig. 2 is an equivalent circuit of a step-twist junction.

If the admittance of a terminated waveguide is examined in the plane of a conventional inductive iris, it may be expressed in normalized form as $1-jB'$. It is simply the parallel combination of the normalized characteristic admittance of the waveguide in parallel with the normalized reactive susceptance of the iris. However, if we examine the admittance of a step-twist junction at the plane of the junction, for a particular angular rotation, it appears to be $g-jB''$, where the conductance $g$ is different than $1$. This being so, it may be regarded as if the physical and the electrical location of the step-twist junction are different, being separated by a length of transmission line. In Fig. 2 there is shown an equivalent circuit of a step-twist junction. It consists of an equivalent pure susceptance B located a distance L from terminals $T_1$ and $T_2$. Thus, if the step-twist junction is viewed at the physical junction from fixed guide 10 looking toward guide 13, the electrical junction appears to be a distance L away from the physical junction. Similarly, if it is viewed from guide 13, looking toward guide 10, it likewise appears electrically to be located at a distance L away from its actual physical location.

Since the lengths L of transmission line are frequency sensitive for a step-twist junction equivalent circuit, it might be expected that, in general, the functional relationship between length and frequency would assume some complicated form. Actually it is found that for relatively narrow bandwidths one may express the lengths of line accurately for a given angular rotation, $\theta$, as $L = a\lambda g$ where $a$ is a constant.

For the usual type of filter, i.e., two pure shunt susceptances $jB'$ separated by a distance $s'$, the design formulas are given by W. W. Mumford in his article entitled "Maximally Flat Filters in Waveguide," published in the October 1948 issue of the Bell System Technical Journal, as $$\tan \frac{2\pi s'}{\lambda_{g0}} = \frac{2}{B'} \quad (1)$$

$$Q = \left[\frac{\lambda_{g0}}{\lambda_{a0}}\right]^2 \frac{\tan^{-1}\frac{2}{B'}}{2\sin^{-1}+\frac{2}{\sqrt{B'^4+4B'^2}}} \quad (2)$$

where

Q is the loaded Q;
$s'$ is the actual distance between susceptances;
$\lambda_{g0}$ is the resonant wavelength in the guide corresponding to the center frequency of the filter;
$\lambda_{a0}$ is the resonant wavelength in free space; and
$B'$ is the susceptance of the reactive members forming the boundaries of the resonant cavity. $B'$ is either positive or negative depending on whether the susceptance is either capacitive or inductive.

It will be noted upon examination of Equations 1 and 2 that as the susceptance is varied, as for example, by varying the apertures formed by a pair of inductive irises, not only does the bandwidth of the filter vary, but since $s'$ is fixed, the center frequency of the filter must also vary to maintain the equality expressed by Equation 1.

On the basis of the equivalent circuit shown in Fig. 2, however, certain changes in the two design equations must be made in order to correctly describe the filter constructed in accordance with the present invention.

Figure 3:
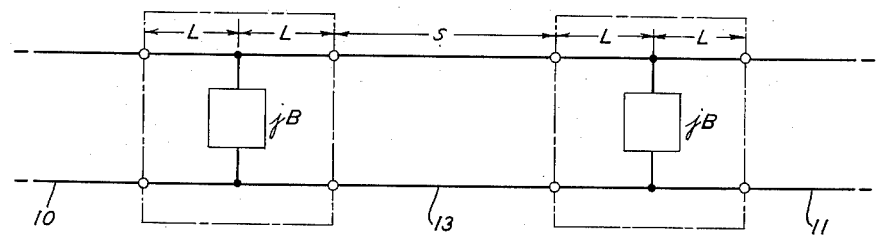
Fig. 3 is an equivalent circuit of a single cavity step-twist junction filter.

As was pointed out above, the electrical location of the pure susceptance associated with the step-twist junction differs from the physical location of the junction by a distance L. In Fig. 3 there is shown the equivalent circuit of the filter of Fig. 1. The total electrical distance between the equivalent susceptances B is equal to s, the physical separation of the planes of the two twist junctions, plus $2L=2a\lambda g$, the length of line added by the equivalent circuits of the twist junctions. Thus Equation 1 becomes, for the step-twist junction filter $$\tan \frac{2\pi}{\lambda_{g0}}(2a\lambda_{g0}+s) = \frac{2}{B} \quad (3)$$

Similarly it can be shown that the loaded Q for the step-twist junction filter is $$Q = \left[\frac{\lambda_{g0}}{\gamma_{a0}}\right]^2 \left[\frac{\tan^{-1}\frac{2}{B}}{2\sin^{-1}\frac{2}{\sqrt{B^4+4B^2}}} - \frac{4\pi a}{2\sin^{-1}\frac{2}{\sqrt{B^4+4B^2}}}\right] \quad (4)$$

By comparing Equation 4 and Equation 2, it is observed that the equivalent pure shunt susceptance B of our equivalent circuit would have to be larger than $B'$, the susceptance of the pure inductive irises, for the same loaded Q. It is also noted from Equation 3 that for a particular resonant frequency, the twist filter will be shorter for any loaded Q than the corresponding filter made with pure susceptance irises. The magnitude of this shortening depends upon the frequency of operation and the desired loaded Q. However, that shortening may be as much as $\lambda_{g0/4}$ in a filter that normally would be on the order of $\lambda_{g0/2}$ in length.

Aside from the aforementioned economy in size realized with filters of this type, Equations 3 and 4 suggest the possibility of constructing filters in which the bandwidth (loaded Q) and resonant frequency may be varied in any prescribed manner by varying the susceptance B and the length L as a function of the angular rotation of section 12. This can be done by controlling the manner in which the size and shape of apertures 19 and 20 vary as section 12 is rotated. Thus, for example, by inserting corrective irises in the nature of conductive septa between the fixed and rotatable sections of guide, it is possible to obtain almost any variation of bandwidth and frequency as a function of angular rotation.

Where the installation is to be permanent or semi-permanent, the irises may be made an integral part of the rotatable or fixed sections. In Fig. 1, conductive members 28, 28', 29 and 29' are soldered to the rotatable section. While they could have been connected to guides 10 and 11, it has been found that by connecting them to the rotatable section, higher Q cavities may be realized.

Figure 4:
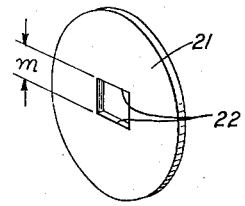
Fig. 4 shows a detachable type corrective iris.

In an alternative embodiment, the irises are made as separate units. In Fig. 4 there is shown a particular corrective iris, typical of the many detachable units that may be designed, comprising a thin circular conductive member 21, having a diameter substantially equal to the diameter of section 12, and in which a square aperture 22 has been cut. The center of aperture 22 coincides with the center of member 21 and the length of each side of the square, indicated as $m$, is substantially equal to the narrow dimension of waveguide 13 of Fig. 1. In a typical application, a corrective iris is attached at each end of section 12, thus turning along with guide 13 as section 12 is rotated. As before, section 12, with the irises mounted, is placed in position between fixed guides 10 and 11 which are then fastened together with the several flange screws.

It should be noted that in adidtion to the size and shape of the corrective iris, its initial orientation relative to guide 13 will affect the filter response. For example, by mounting the iris shown in Fig. 4 so that the sides of aperture 22 are parallel to the sides of guide 13, a filter will be produced in which the bandwidth may be varied as a function of the angular rotation of the filter while the center frequency remains substantially constant.

By making the corrective irises as separate, detachable units, the utility of the filter structure of Fig. 1 is substantially enhanced. Since it is a relatively simple operation to replace the corrective irises, the filter bandwidth-frequency characteristic may be readily modified by making the necessary change. In addition, as the irises are relatively inexpensive to construct, a variety of them may be made and stored for future use, as required.

The filter is coupled to a wave energy system by means of flanges 23 and 24 which are soldered to the ends of guides 10 and 11. They may be either choke flanges or plain flanges, built in accordance with techniques well known in the art.

As shown in Fig. 1, rotation of section 13 is achieved by means of handle 27. This represents the simplest means of controlling the filter twist angle. The twist angle may, however, be adjusted automatically by means of a feedback circuit which monitors some characteristic of the output signal. An error signal thereby obtained may then be used to activate an energy means for altering the twist angle, thus maintaining a predetermined output condition. These and other control techniques will suggest themselves to those skilled in the art.

*Multiple cavity filters*

Figure 5:
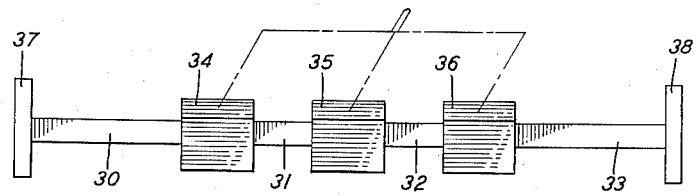
Fig. 5 shows a multiple cavity step-twist junction filter.

When the required filter response cannot be achieved with a single resonant cavity, a number of resonant chambers may be spaced along the transmission line to provide the desired characteristics. In Fig. 5, there is shown a multiple cavity step-twist filter having three rotatable resonant chambers 34, 35 and 36 and four sections of fixed guides 30, 31, 32 and 33.

Figure 6:
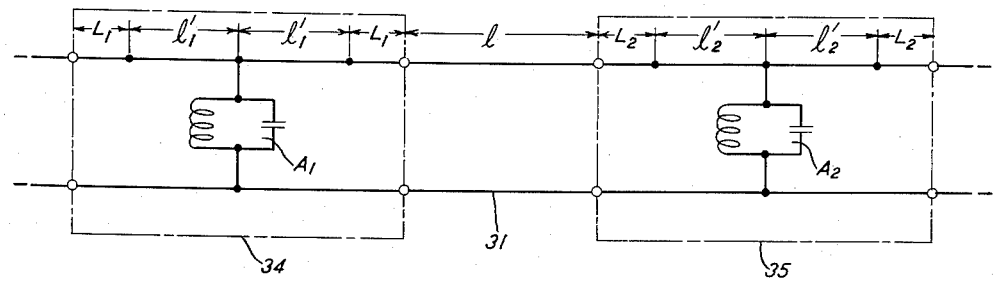
Fig. 6 is an equivalent circuit of a two cavity step-twist junction filter.

As is well known, a single resonant cavity bounded by pure susceptance irises may be represented as a simple parallel resonant circuit and a length of transmission line. This much of the equivalent circuit of cavity 34 is represented in Fig. 6 by tuned circuit $A_1$ and line lengths $l'_1$. However, for cavities bounded by irises which are not pure susceptances, as for example, a cavity bounded by a pair of step-twist junctions, an additional length of line, $L_1$, must be added to complete the equivalent circuit, The added length $L_1$ corresponds to length $L$ shown in Fig. 2 and, for a particular angular rotation, $\theta$, is equal to a constant $a_1$ times the wavelength $\lambda_g$ of the wave energy incident upon the junction.

Cavities 34, 35 and 36 may be substantially alike or, where the particular application requires otherwise, may differ from each other in any prescribed manner. In Fig. 6, there is shown the equivalent circuit of cavities 34 and 35 separated by the section of fixed guide 31 of length $l$. As indicated in the figure, cavities 34 and 35 are different. However, whether they are similar or not, the usual odd quarter wave coupling between cavities is affected when the equivalent tuned circuits $A_1$ and $A_2$ are spaced a quarter wavelength apart or odd multiples thereof. This may be expressed as $$l + (L_1 + L_2) + (l'_1 + l'_2) = (2n+1)\frac{\lambda_{g0}}{4} \quad (5)$$

or $$l = (2n+1)\frac{\lambda_{g0}}{4} - (L_1 + L_2) - (l'_1 + l'_2)$$

where $n$ is any positive integer including zero.

In terms of the physical distance $s$ between the step-twist junctions forming the individual cavities, $$l'_1 = \frac{\lambda_{g0}}{4} - \frac{s_1 + 2L_1}{2}$$

and $$l'_2 = \frac{\lambda_{g0}}{4} - \frac{s_2 + 2L_2}{2} \quad (6)$$

Substituting (6) in (5), $l$ may then be expressed in terms of $s$ as $$l = (2n-1)\frac{\lambda_{g0}}{4} + \frac{s_1 + s_2}{2} \quad (7)$$

Where the cavities are the same, $s_1 = s_2 = s$ and Equation 7 reduces to $$l = (2n-1)\frac{\lambda_{g0}}{4} + s \quad (8)$$

A similar expression which expresses the distance between cavities in terms of the physical separation between the irises making up the individual cavities may be written for cavities bounded by pure susceptance irises. Recalling, from the discussion above, that for a particular resonant frequency, the twist filter will be shorter for any loaded Q than the corresponding filter made with pure susceptance irises, it is evident that not only are the individual cavities in a step-twist junction filter smaller than the usual type cavities, but the space between multiple cavities is correspondingly smaller as well. Thus, multiple cavity, step-twist filters will be substantially smaller than ordinary multiple cavity filters.

What is of greater importance, however, is the fact that it is now possible to construct adjustable multiple cavity filters. As with the single cavity filter, corrective irises may be used to maintain, for example, a substantially constant center frequency as the filter is rotated about the common axis. With a constant center frequency, $s$ in Equation 8 is a constant and as a consequence the distance $l$ between cavities is also a constant and hence always the correct distance to maintain the odd quarter wave coupling between cavities. Thus, it is possible to design either single or multiple cavity filters having adjustable bandwidths, that may be continuously varied over a broad range, without the need for returning the cavities or readjusting the distances between cavities. Other effects may be obtained depending upon how the various rotatable sections are ganged. For example, the cavities may be ganged to have no relative angular displacement relative to each other, or they may have some preset relative displacement to produce some particular effect.

In all cases it is understood that the above described arrangements are illustrative of a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. A variable resonant cavity filter having a given frequency-bandwidth characteristic comprising a tuned section of rectangular waveguide bounded by a pair of apertures lying in planes transverse to the longitudinal axis of said guide, said apertures being formed by said guide abutting upon the cofacing ends of a pair of fixed sections of rectangular waveguide, means for rotating said tuned guide about said axis relative to said fixed guides and electromagnetic wave discontinuities extending into each of said apertures for controlling the frequency-bandwidth characteristic of said filter as a function of said rotation.

2. In an electromagnetic wave filtering system having a given frequency-bandwidth characteristic, first, second and third sections of rectangular waveguide longitudinally disposed along a common axis, said first and third sections being fixed in position relative to each other, said second section being located between said fixed sections the cofacing ends of said sections adjacent to each other forming a pair of step-twist junctions, said second section and said junctions forming a resonant cavity, means for rotating said second section about said common axis relative to said fixed sections and means for coupling wave energy between said sections comprising conductive septa interposed between said second section and said fixed sections at each of said junctions for varying said frequency-bandwidth characteristic in a predetermined manner.

3. The combination according to claim 2 wherein said conductive septa comprise replaceable thin conductive members each having an aperture designed for a particular filter response.

4. The combination according to claim 2 wherein said conductive septa comprise replaceable thin conductive members each having a square aperture whose center is located along the longitudinal axis and whose side has a dimension equal to the length of the narrow side of the rotatable guide.

5. The combination according to claim 2 wherein the physical length of the rotatable section and the loaded Q of said filter are given as $$\tan \frac{2\pi}{\lambda_{g0}}(2a\lambda_{g0}+s) = \frac{2}{B}$$

$$Q = \left[\frac{\lambda_{g0}}{\gamma_{a0}}\right]^2 \left[\frac{\tan^{-1}\frac{2}{B}}{2\sin^{-1}\frac{2}{\sqrt{B^4+4B^2}}} - \frac{4a\pi}{2\sin^{-1}\frac{2}{\sqrt{B^4+4B^2}}}\right]$$

where $\lambda_{g0}$ is the resonant wavelength in the guide corresponding to the cavity frequency,
$\lambda_{a0}$ is the resonant wavelength in free space,
$a$ is a constant,
$s$ is the physical distance between junctions,
$B$ is the equivalent susceptance of each junction,
$Q$ is the loaded Q of the filter.

6. A filter for electromagnetic wave energy comprising a plurality of fixed and a plurality of movable sections of rectangular waveguide coaxially disposed along a common longitudinal axis with the cofacing ends of said sections abutting upon each other to form a plurality of step-twist junctions, means for rotating said movable sections relative to said fixed sections about said axis, and coupling means for controlling the frequency-bandwidth characteristic of said filter as a function of the angular rotation of said movable sections relative to said fixed sections comprising electromagnetic wave discontinuities extending into said movable waveguide sections at each of said junctions.

7. The combination according to claim 6 wherein said conductive discontinuities form a square aperture whose center is located along the longitudinal axis and whose side has a dimension equal to the length of the narrow side of said movable sections.

8. The combination according to claim 6 wherein the length of fixed section between adjacent movable sections is given as $$l = \frac{(2n-1)}{4}\lambda_{g0} + \frac{\lambda_{g0}}{4\pi}\left[\tan^{-1}\frac{2}{B_1} + \tan^{-1}\frac{2}{B_2}\right] - \lambda_{g0}[a_1 + a_2]$$

where
$l$ is the length of fixed section between adjacent movable sections,
$B_1$ and $B_2$ are the equivalent susceptances at said coupling means for each of said adjacent movable section,
$a_1$ and $a_2$ are constants associated with each of said movable cavities for a particular angular displacement, and
$\lambda_{g0}$ is the resonant wavelength in the cavities.

9. An electromagnetic wave filter comprising a plurality of rectangular waveguide sections both fixed and movable disposed in an abutting relationship along a common longitudinal axis, the cofacing ends of said abutting sections defining coupling apertures therebetween, said apertures lying in transverse planes normal to said longitudinal axis, means for rotating a movable section relative to said fixed sections about said axis, and electromagnetic wave discontinuities extending into the region of said apertures, said discontinuities and said movable section proportioned to form a resonant cavity having a predetermined center frequency and bandwidth characteristic, said discontinuities further proportioned to cause said resonant center frequency and said bandwidth characteristic to vary in a predetermined manner as a function of the angular rotation of said movable section.

References Cited in the file of this patent

UNITED STATES PATENTS

| | | |
|---|---|---|
| 2,423,130 | Tyrrell | July 1, 1947 |
| 2,473,834 | Tuller | June 21, 1949 |
| 2,541,375 | Mumford | Feb. 13, 1951 |
| 2,634,332 | Zaleski | Apr. 7, 1953 |
| 2,736,867 | Montgomery | Feb. 28, 1956 |

FOREIGN PATENTS

| | | |
|---|---|---|
| 510,704 | Belgium | May 15, 1952 |